US010402841B2

(12) United States Patent
Radhakrishnan et al.

(10) Patent No.: US 10,402,841 B2
(45) Date of Patent: *Sep. 3, 2019

(54) ENABLING A USER TO VERIFY A PRICE CHANGE FOR AN ON-DEMAND SERVICE

(71) Applicant: Uber Technologies, Inc., San Francisco, CA (US)

(72) Inventors: Mina Radhakrishnan, San Francisco, CA (US); Shalin Amin, San Francisco, CA (US); Curtis Chambers, San Francisco, CA (US); Ryan McKillen, San Francisco, CA (US); Travis Cordell Kalanick, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 588 days.

This patent is subject to a terminal disclaimer.

(21) Appl. No.: 15/050,931

(22) Filed: Feb. 23, 2016

(65) Prior Publication Data

US 2016/0171515 A1 Jun. 16, 2016

Related U.S. Application Data

(63) Continuation of application No. 13/830,449, filed on Mar. 14, 2013, now Pat. No. 9,305,310.

(Continued)

(51) Int. Cl.
*G06Q 30/06* (2012.01)
*G06Q 30/02* (2012.01)

(52) U.S. Cl.
CPC ..... *G06Q 30/0206* (2013.01); *G06Q 30/0283* (2013.01); *G06Q 30/0284* (2013.01);
(Continued)

(58) Field of Classification Search
None
See application file for complete search history.

(56) References Cited

U.S. PATENT DOCUMENTS 6,356,838 B1 3/2002 Paul
7,539,650 B2 * 5/2009 Podgurny .............. G06Q 10/08
705/400

(Continued)

FOREIGN PATENT DOCUMENTS

CN 1484172 3/2004
CN 101378581 3/2009
(Continued)

OTHER PUBLICATIONS

Huet, E., "How Ride-Share Services Skirt Taxi Regulations," San Francisco Chronicle, p. D1, Sep. 3, 2012.*

(Continued)

*Primary Examiner* — Nicholas D Rosen
(74) *Attorney, Agent, or Firm* — Mahamedi IP Law LLP

(57) ABSTRACT

A method for enabling a user to verify a price change for an on-demand service is provided. One or more processors can determine a real-time price for providing the on-demand service to the user. The one or more processors can determine when the real-time price is equal to or exceeds a threshold price. In response to a request from the user for the on-demand service when the real-time price is equal to or exceeds the threshold price, an intermediate interface can be provided that the user is to correctly respond to before a service request can be transmitted to a service system.

20 Claims, 13 Drawing Sheets

Related U.S. Application Data

(60) Provisional application No. 61/612,471, filed on Mar. 19, 2012.

(52) U.S. Cl.
CPC ..... *G06Q 30/0605* (2013.01); *G06Q 30/0641* (2013.01); *G06Q 30/0601* (2013.01); *G06Q 30/0633* (2013.01); *G06Q 30/0635* (2013.01); *G06Q 30/0637* (2013.01)

(56) References Cited

U.S. PATENT DOCUMENTS

| | | | |
|---|---|---|---|
| 7,783,516 B2 | 8/2010 | Stoffelsma et al. | |
| 7,827,104 B2 | 11/2010 | Posabella et al. | |
| 7,917,153 B2 | 3/2011 | Orwant et al. | |
| 7,930,098 B2 | 4/2011 | Huang | |
| 7,974,779 B2 | 7/2011 | Huang | |
| 8,036,824 B2 | 10/2011 | Huang | |
| 8,095,305 B2 | 1/2012 | Huang | |
| 8,103,576 B2 | 1/2012 | Farrell et al. | |
| 8,311,560 B2 | 11/2012 | Kong | |
| 8,538,374 B1 | 9/2013 | Haimo et al. | |
| 8,554,608 B1 | 10/2013 | O'Connor | |
| 8,624,727 B2 | 1/2014 | Saigh et al. | |
| 8,630,897 B1 | 1/2014 | Prada Gomez | |
| 8,634,804 B2 | 1/2014 | McNamara | |
| 8,719,391 B2 | 5/2014 | Hamalainen et al. | |
| 8,768,294 B2 | 7/2014 | Reitnour et al. | |
| 8,855,916 B2 | 10/2014 | Meredith et al. | |
| 9,066,206 B2 | 6/2015 | Lin | |
| 9,147,335 B2 | 9/2015 | Raghunathan | |
| 9,305,310 B2* | 4/2016 | Radhakrishnan | G06Q 30/0283 |
| 9,424,515 B2 | 8/2016 | Atlas | |
| 9,843,897 B1 | 12/2017 | Lin | |
| 2002/0143587 A1* | 10/2002 | Champernowne | G06Q 10/02 705/5 |
| 2003/0061179 A1 | 3/2003 | Reece | |
| 2003/0084125 A1 | 5/2003 | Nagda et al. | |
| 2003/0163378 A1* | 8/2003 | Podgurny | G06Q 10/08 705/26.1 |
| 2004/0103120 A1* | 5/2004 | Fickle | G06Q 10/10 |
| 2004/0219933 A1 | 11/2004 | Faith | |
| 2005/0229219 A1 | 10/2005 | Posabella et al. | |
| 2006/0034201 A1 | 2/2006 | Umeda et al. | |
| 2006/0059023 A1 | 3/2006 | Mashinsky | |
| 2006/0235739 A1 | 10/2006 | Levis et al. | |
| 2007/0093247 A1 | 4/2007 | Raziq | |
| 2007/0244730 A1 | 10/2007 | Johnson | |
| 2008/0046356 A1 | 2/2008 | Farrell et al. | |
| 2008/0114629 A1 | 5/2008 | Pavlov | |
| 2008/0122691 A1 | 5/2008 | Carani et al. | |
| 2008/0195428 A1 | 8/2008 | O'Sullivan | |
| 2009/0030749 A1 | 1/2009 | Drummond et al. | |
| 2009/0037194 A1 | 2/2009 | Roche | |
| 2009/0113296 A1 | 4/2009 | Lacy | |
| 2009/0176508 A1 | 7/2009 | Lubeck et al. | |
| 2009/0281844 A1 | 11/2009 | Probst | |
| 2010/0023376 A1 | 1/2010 | Brown | |
| 2010/0280852 A1* | 11/2010 | Huang | B60R 25/00 705/4 |
| 2010/0293030 A1 | 11/2010 | Wu | |
| 2011/0112768 A1 | 5/2011 | Doyle | |
| 2011/0131238 A1 | 6/2011 | Peeters et al. | |
| 2011/0136468 A1 | 6/2011 | McNamara et al. | |
| 2011/0231493 A1 | 9/2011 | Dyor | |
| 2011/0307282 A1 | 12/2011 | Camp | |
| 2012/0041675 A1 | 2/2012 | Juliver et al. | |
| 2012/0046110 A1 | 2/2012 | Amaitis et al. | |
| 2012/0101651 A1 | 4/2012 | Haynes | |
| 2012/0200411 A1 | 8/2012 | Best | |
| 2012/0215594 A1* | 8/2012 | Gravelle | G07B 15/02 705/13 |
| 2012/0232943 A1 | 9/2012 | Myr | |
| 2012/0323642 A1 | 12/2012 | Camp et al. | |
| 2013/0030871 A1 | 1/2013 | Schwitzky | |
| 2013/0085817 A1 | 4/2013 | Pinkus | |
| 2013/0090959 A1 | 4/2013 | Kvamme et al. | |
| 2013/0144831 A1 | 6/2013 | Atlas | |
| 2013/0173393 A1 | 7/2013 | Calman | |
| 2013/0246207 A1 | 9/2013 | Novak et al. | |
| 2013/0297674 A1 | 11/2013 | Jain | |
| 2013/0310053 A1 | 11/2013 | Srivastava et al. | |
| 2013/0339076 A1 | 12/2013 | Baranda | |
| 2014/0032297 A1 | 1/2014 | Germann | |
| 2014/0066090 A1 | 3/2014 | Henderson | |
| 2014/0229258 A1* | 8/2014 | Seriani | G06Q 30/08 705/14.23 |
| 2014/0257681 A1 | 9/2014 | Kummamuru et al. | |
| 2015/0031388 A1 | 1/2015 | Chatterjee et al. | |
| 2015/0148060 A1 | 5/2015 | Parab et al. | |
| 2015/0248689 A1 | 9/2015 | Paul | |

FOREIGN PATENT DOCUMENTS

| | | |
|---|---|---|
| CN | 101996485 | 3/2011 |
| CN | 102073970 | 5/2011 |
| JP | H09153098 A | 11/1995 |
| JP | 2007249918 | 9/2007 |
| JP | 2011108194 | 6/2011 |
| KR | 2005/0119239 A | 12/2005 |
| KR | 2008/0044606 A | 5/2008 |
| KR | 10-2011-0061568 | 6/2011 |
| KR | 2011/0061414 A | 6/2011 |
| WO | WO-03/040972 A1 * | 5/2003 |
| WO | WO 2003/040972 | 5/2005 |
| WO | WO 2010-123075 | 10/2010 |
| WO | WO 2011/067741 | 6/2011 |
| WO | WO 2013-166216 | 11/2013 |
| WO | WO 2014/074407 | 5/2015 |

OTHER PUBLICATIONS

International Search Report and the Written Opinion as issued in corresponding application PCT/US2013/048257, dated Oct. 22, 2013.
International Preliminary Report on Patentability dated Jan. 15, 2015.
International Search Report in related PCT/US2015/021227 dated Jun. 18, 2015.
Hai Yang et al. "Equilibria of bilateral taxi-customer searching and meeting on networks", Transportation Research Part B., 2010, vol. 44, pp. 1067-1083.
International Search Report and the Written Opinion as issued in PCT/US2016/012688, dated Apr. 28, 2016.
Office Action in AU2016208350 dated Jan. 19, 2018.
Office Action in CN 2017111362851 dated Sep. 10, 2018.
Search Report accompanying Sep. 10, 2018 Office Action in CN 2017111362851 dated Aug. 30, 2018.
Office Action in CA 2,923,656 dated Aug. 21, 2018.

* cited by examiner

US 10,402,841 B2

ENABLING A USER TO VERIFY A PRICE CHANGE FOR AN ON-DEMAND SERVICE

RELATED APPLICATION

This application is a Continuation of U.S. patent application Ser. No. 13/830,449 filed Mar. 14, 2013, now U.S. Pat. No. 9,305,310 which claims benefit of priority to U.S. Provisional Patent Application No. 61/612,471, filed Mar. 19, 2012; the aforementioned applications being hereby incorporated by reference in their entirety.

BACKGROUND

There are many real-world services that a user can access through a mobile computing device. Typically, such services operate under a fixed pricing scheme. With the availability of mobile communications, however, demand for such services can vary dramatically.

DETAILED DESCRIPTION

Figure 1:
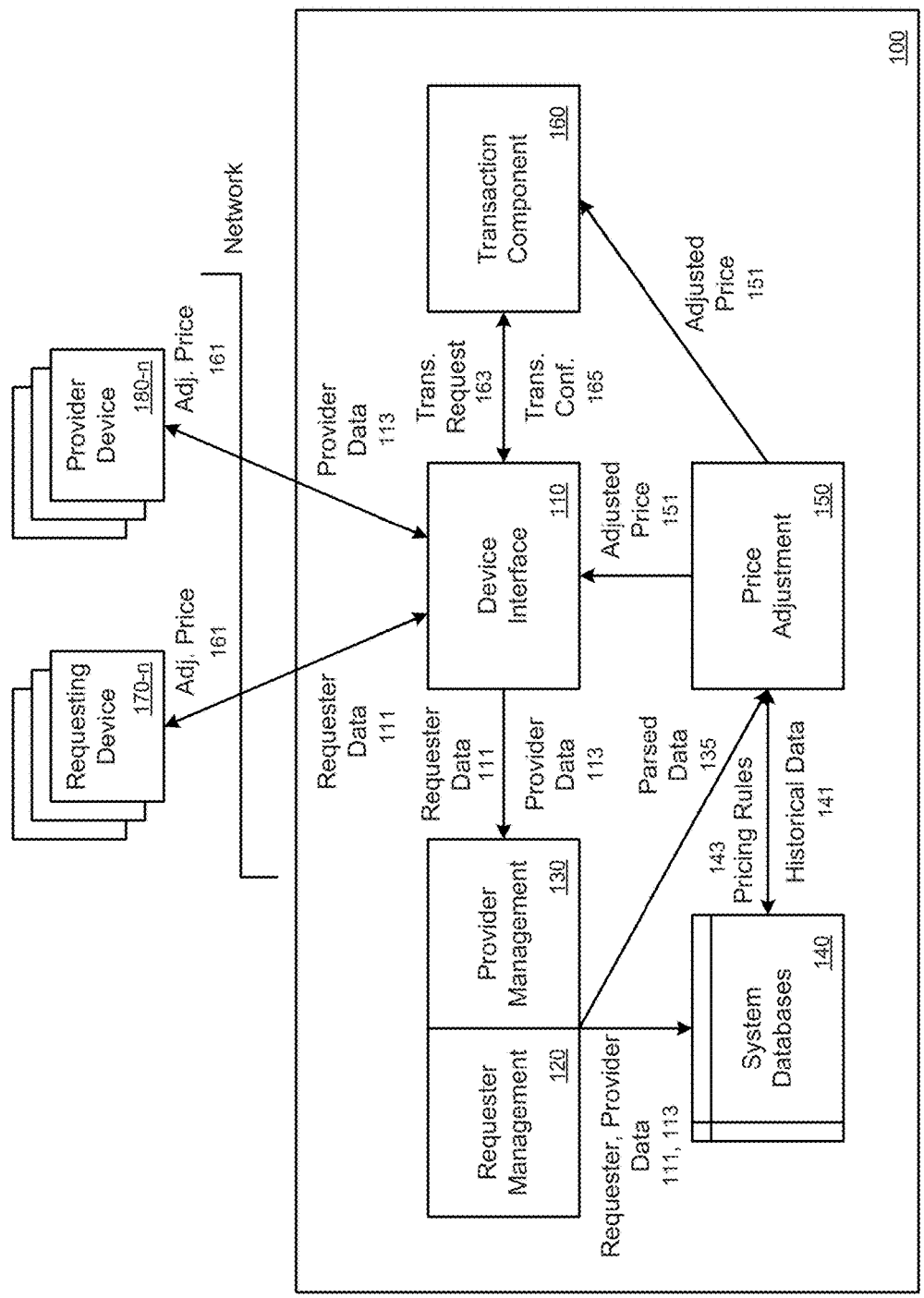
FIG. 1 illustrates an example price adjustment system, under an embodiment.

Embodiments described herein provide for a system that dynamically adjusts prices for services based on real-time conditions at a particular time. The dynamically adjusted price can be displayed to a user of a computing device that requests the service, and the service can be provided to the user at the adjusted price.

According to embodiments, the system determines or approximates an amount of users or requesters for a particular service at a given time. A service that is requested by a user or requester using a mobile computing device can include on-demand services, geographically-based (or location-based) services, and/or transport services. Such services can include, for example, a delivery service, a babysitting service, an entertainment service, a moving service, a food service, or a taxi service. The system determines or approximates an amount of available service providers for providing the service at the given time. Based on the determined amount of requesters and the determined amount of available service providers, the system adjusts a price, relative to a default price, for using the service provided by one or more service providers.

Still further, the system can transmit pricing data that corresponds to the adjusted price to a requesting device(s) (e.g., a computing device of a customer or requesting user) and/or to a provider device(s) (e.g., a computing device of a service provider or supplier). The computing devices that receive the pricing data can display the adjusted price (such as part of a user interface) on their respective displays, to indicate an adjustment in price as compared to the default price. The requesting user and/or the service provider can operate their respective computing devices to view the adjusted price and choose to consent to the adjusted price for using the service and/or for providing the service, respectively.

In some embodiments, the system can determine the amount of requesters for a service and/or the amount of available service providers based on data received from one or more requesting devices and/or data received from one or more provider devices at a given instance in time or time period. The system can also make the determinations based on historical data (stored in a memory resource or database of the system) that is comparable to the given instance in time or time period.

As described herein, a "user," a "requester," or a "customer" are invariably used to refer to individuals that are requesting or ordering a service. Also as described herein, a "provider," a "service provider," a "supplier," or a "vendor" are invariably used to refer to individuals or entities that can provide the service. As an example, a user can request a service, such as a transportation or delivery service (e.g., food delivery, messenger service, food truck service, or product shipping) or an entertainment service (e.g., mariachi band, string quartet) using the system, and a service provider, such as a driver, food provider, band, etc. can communicate with the system and/or the user to arrange for the service. In addition, as described herein, "requesting devices" and "provider devices" refer to computing devices that can correspond to desktop computers, cellular or smart-phones, laptop computers, tablet devices, television (IP Television), etc., that can provide network connectivity and processing resources for enabling a user to communicate with a system over a network. A provider device can also correspond to taxi meters or other metering devices.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, laptop computers, printers, digital picture frames, network equipments (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example price adjustment system, under an embodiment. In particular, FIG. 1 illustrates a system that enables services to be arranged between parties (e.g., arrange transport between a requester for a service and a service provider). The system can use data currently received from requesters and service providers and/or data previously collected in order to adjust a price of a service based on real-time conditions. In this manner, the system can dynamically implement more effective pricing decisions for the service based on current supply and demand conditions for the service. A system such as described can be implemented in various contexts.

System 100 includes a device interface 110, a requester management 120, a provider management 130, a system database(s) 140, a price adjustment 150, and a transaction component 160. In one implementation, the components of system 100 can combine to enable a service to be arranged between customers (e.g., users who operate one or more requesting devices 170) and service providers (e.g., individuals or entities who operate one or more provider devices 180). For example, the components of system 100 can be implemented on network side resources, such as on one or more servers. System 100 can also be implemented through other computer systems in alternative architectures (e.g., peer-to-peer networks, etc.).

As an alternative or addition, some or all of the components of system 100 can be implemented on client machines, such as through applications that operate on the requesting devices 170 and/or provider devices 180. For example, a client application can execute to perform one or more of the processes described by the various components of system 100. System 100 can communicate over a network, via a network interface (e.g., wirelessly or using a wireline), to communicate with the one or more requesting devices 170 and the one or more provider devices 180.

The device interface 110 manages communications between system 100 and the requesting devices 170 and the provider devices 180 over a network. Each of the requesting devices 170 can download, store, and operate an application(s) that can interface with the device interface 110 in order to provide information to and/or receive information from the device interface 110. Similarly, service providers can operate their respective provider devices 180 to download, store, and operate an application(s) (e.g., a different application than the application used by a customer, or the same application) that can interface with the device interface 110. For example, the applications can include or use an application programming interface (API), such as an externally facing API, to communicate data with the device interface 110. The externally facing API can provide access to system 100 via secure access channels over the network through any number of methods, such as web-based forms, programmatic access via restful APIs, Simple Object Access Protocol (SOAP), remote procedure call (RPC), scripting access, etc., while also providing secure access methods including key-based access to ensure system 100 remains secure and only authorized users, service providers, and/or third parties can gain access to system 100.

Depending on different variations, the device interface 110 can receive, over a network, requester data 111 from one or more requesting devices 170 and/or provider data 113 from one or more provider devices 180 at different times. In one implementation, system 100 can be configured (e.g., by an administrator that is not the customer or the service provider) to receive data from the requesting devices 170 and/or the provider devices 180 at a particular time or every time a device 170, 180 accesses its respective application. For example, the device interface 110 can receive the requester data 111 and/or the provider data 113 periodically, at different instances in time, or based on a set schedule. The device interface 110 can also receive the data for different durations in time (e.g., receive data for durations of five minute, thirty minutes, twenty four hours, etc.). In some implementations, data can be received from a requesting device 170 when a user launches or operates the application (or performs other actions relating to the application or the requesting device while the application is being run). Similarly, data can be received from a provider device 180 when a service provider launches or operates the application stored on the provider device 180 (or performs other actions relating to the application or the requesting device while the application is being run).

Using requester data 111 received from the requesting devices 170 and provider data 113 received from the provider devices 180, system 100 can determine current, up-to-date information about supply and demand conditions in order to properly set or adjust a price for a service. In some examples, the requester data 111 can be used (in part) to determine the current number and/or the current location of requesters for the service (e.g., this can represent the demand for the service) at a given time. Similarly, the provider data 113 can be used (in part) to determine the current number and/or the current location of available service providers capable of fulfilling the service at the given time (e.g., this can represent the supply for fulfilling the service).

Depending on implementations, the requester data 111 can include data indicating (i) a requesting device launching an application used for requesting the service, (ii) a requesting device requesting the service using the application (e.g., place an order), (iii) a requesting device closing or shutting down the application, (iv) a current location of a requesting device, (v) a destination or service location requested by a requesting device, (vi) a route requested by a requesting device, (vii) a type of service (e.g., a type or class of vehicle, or a type of food service) requested by a requesting device, (viii) a profile associated with a requesting device (e.g., a user's profile and/or account), (ix) a beginning time to start the service, or (x) an ending time for completion of the service.

For example, when a customer launches the application using a smartphone in order to request a service, the application can cause data, such as the customer's profile/account information, the current location of the customer (e.g., the current location of the device), and the service destination of the customer, to be provided to the device interface 110 over the network. Other types of requester data 111 can also be received from the requesting devices 170, such as the current date and time, the number of people requesting the service using the requesting device (e.g., the number of people in the party), the type of the requesting device, and version information of the application running on the requesting device.

In other examples, the provider data 113 can include data indicating (i) an availability of a service provider, (ii) a current state of a service provider (e.g., currently providing a service, currently idle, out of commission, etc.), (iii) a current location of a provider device, (iv) a type of service (e.g., a type or class of vehicle) of a service provider, (v) a current data or time, or (vi) a profile associated with a provider device (e.g., a service provider's profile and/or account). The provider data 113 can also include data that indicates the type of the provider device and version information of the application running on the provider device. Once the data is received (and/or while the data is being received) over the network, the device interface 110 can provide the received requester data 111 and the received provider data 113 to requester management 120 and provider management 130, respectively.

The requester management 120 and the provider management 130 each receives requester data 111 and provider data 113, respectively, handles the data, processes the data to determine relevant information for adjusting prices, and stores the data in one or more memory resources (e.g., in one or more databases 140 that are accessible by components of system 100). In one example, the requester management 120 processes requester data 111 that has been transmitted to system 100 by the requesting devices 170 while the provider management 130 processes provider data 113 that has been transmitted to system 100 by the provider devices 180. In another variation, a single management component can process all the data received from the various devices. Because the device interface 110 can receive a large amount of data from the requesting devices 170 and the provider devices 180, the requester management 120 and the provider management 130 handles and organizes the requester data 111 and the provider data 113 for storage in one or more databases 140. For example, some of the data can be deleted, categorized, organized into tables (e.g., based on time and/or date), etc. so that components of system 100 can easily access the data from the databases to retrieve necessary information.

In some variations, each of the requester management 120 and the provider management 130 can also handle the authentication of the respective devices (and their users) for interacting with system 100. For example, for each requesting device 170 that provides requester data 111 to system 100 (e.g., in response to the users operating the application for requesting a service), the requester data 111 can include account or user information provided by the user (e.g., after the user logs in to the service via the application using a log in and password). The requester management 120 can authenticate the users before enabling the users to request the service. The requester management 120, for example, can compare the log in information with account or user information stored in a database (e.g., in response to the user previously registering or registering his or her devices) to determine if there is a match. Similarly, the provider management 130 can authenticate the service providers (and their provider devices 180) to verify the identity of the service provider. In some implementations, the requesting devices 170 and the provider devices 180 can exchange information (e.g., allow data sharing over the network) with the device interface 110 only after the users and service providers have been authenticated.

The requester management 120 and the provider management 130 can also process and parse the received data in order to determine relevant information that the price adjustment 150 can use in order to adjust a price for a service. At a given time (for example, at an instance in time every five minutes or every ten minutes), the price adjustment 150 can adjust a price for the service based on the amount of requesters that are requesting (e.g., attempting to order) the service and the amount of available service providers that can fulfill the requests. The parsed data 135 can correspond to information that can be used by the price adjustment 150 to determine or approximate an amount of requesters for a service at a given time and an amount of available service providers at the given time.

The requester management 120 and the provider management 130 can provide parsed data 135 to the price adjustment 150 that includes information about the current time, the current location of the requesting devices 170 and the provider devices 180 (e.g., where the service provider is currently located to determine if he or she is available for fulfilling service requests to those in a particular geographic area), the current state of the service provider or the service provider's vehicle, the type of vehicles that are being requested, and/or the requested destination or service locations of the requesters. For example, the price for a transportation service (pickup and drop off) can be adjusted for different users and different service providers (e.g., drivers) based on the current time and the current location of the requesting devices 170 and the provider devices 180. The number of requesters and the number of available drivers can vary depending on a particular geographic area (e.g., a city, a metropolitan area, or groups of towns).

For example, in San Francisco, there can be a high number of requesters at a certain time (e.g., around 10 pm after a baseball game has ended) where transportation services or food services are requested so that there is a spike in demand, while supply (e.g., the availability of service providers or drivers) remains the same. In comparison, in a nearby city, such as San Jose, there is no spike in demand for the transportation services or food services at the same time. Due to the limited availability (e.g., inventory) of drivers and vehicles, system 100 can adjust the price for the service (e.g., increase the cost) for the requesters in San Francisco (or to requesters in a region within San Francisco). For those requesters and service providers, the price for the particular service can be adjusted (e.g., increased), while the price (e.g., the default price value) for other requesters and services providers in other areas remains the same. The parsed data 135 can also be stored in one of the system databases, such as a pricing data database, so that the price adjustment 150 can retrieve previously parsed data 135 at different times.

The requester management 120 and the provider management 130 can continually or periodically store requester data 111 and provider data 113, as well as the parsed data 135 to the appropriate system databases 140 so that a historical record can be maintained. The historical record can include requester data 111 and provider data 113 received at particular dates and times previously received by system 100. In some examples, the historical data can also be used to approximate the amount of requesters and the amount of service providers at a particular geographic region at a certain time and/or date. In this manner, information can be collected, stored, and maintained for future use (e.g., for price adjustment at a later time or for predicting future supply and demand for the service). For example, the data collected on Friday evenings can be useful in predicting supply and demand for future Friday evenings (e.g., can be used to determine trends). Forecasting future spikes in demand, for example, can be useful in making sure a sufficient amount of service providers are available at the future time to meet the high demands.

The system databases 140 can also include a rules or models database, which store entries corresponding to rules and/or models used by the price adjustment 150 for making dynamic pricing decisions. For example, the models can include relevant economic models for adjusting prices for services based on supply and demand. The rules and models database can include rules for limiting the increase or decrease in price adjustment (e.g., set a ceiling and/or a floor). For example, a rule can place a limit on the price for the service to be adjusted by preventing the price from being adjusted to more than three times the default price (e.g., max increasing adjustment is 3×). Similarly, the limit can prevent the price from being adjusted to less than 0.5 times the default price (e.g., max decreasing adjustment is 0.5×).

The price adjustment 150 determines or approximates an amount of requesters for a service at a given time and an amount of available service providers at the given time (e.g., a set of available service providers that can fulfill the service requests for a set of requesters in a given area and at the given time). In one implementation, the price adjustment 150 can make these determinations by using parsed data 135 received directly from the requester management 120 and the provider management 130 and/or retrieved from one or more system databases 140, and/or by using historical data 141 retrieved from one or more system databases 140. The historical data 141 that is used by the price adjustment 150 can be data that is comparable to the given time. For example, if the price adjustment 150 is configured to make an adjustment on a holiday, such as at night at 9 pm on Halloween (October 31), the price adjustment 150 can use historical data 141 that is comparable to previous Halloweens (e.g., data from Halloween for the last three years, or the last five years) that were provided by requesting devices 170 and provider devices 180 around the same time (e.g., night). The price adjustment 150 can also use historical data 141 that in a more specific manner, for example, by using historical data 141 that corresponds to data received at 9 pm every night for the past month.

Based on the determined locations and amount of requesters and the determined locations and amount of available service providers, the price adjustment 150 can apply one or more rules or models 143 in order to determine whether to adjust a price for the service. For example, a model or metric that the price adjustment 150 can use to adjust the price for a service can be based on a utilization parameter. The utilization parameter can indicate a percentage (e.g., 70% or 80%) of service providers that are currently performing or providing the service compared to the total number of service providers in the inventory. For example, using the determined amounts and locations, the utilization parameter can indicate that out of a possible 100 service providers in a given area, 80 of them are currently servicing users (e.g., a utilization of 80%). The model or metric can set a threshold amount (e.g., percentage) that the price adjustment 150 can use to determine whether to adjust the price. The model can provide that prices should remain the same, for example, if the utilization percentage is between 60% and 80% (e.g., prices are ideal where they are). On the other hand, if the utilization percentage is less than 60%, the price can be reduced or decreased, and if the utilization percentage is greater than 80%, the price can be increased. In other variations, the model can be a supply and demand model that compares the amount of requesters compared to the amount of available service providers, and increases or decreases the price based on the comparison.

The price adjustment 150 can adjust the price relative to a default price by using multipliers. For example, the price adjustment 150 can determine that the price needs to be increased for the service (e.g., there is a high number of requester and a low number of available service providers, respectively). In one implementation, the price adjustment 150 can apply a multiplier, such as 1.5×, to indicate that the price needs to be increased by 1.5 times the default price value. Similarly, the price adjustment can decrease the price using a multiplier, such as 0.75×, to indicate that the price needs to be decreased by 0.75 times the default price value. In another example, prices can be adjusted by simply adding or subtracting a value.

A default price or price value can correspond to different types of fees or costs for a service. For example, the default price can be a cost per amount of time (e.g., dollar per minute), a cost per amount of distance traveled (e.g., dollar per mile), a flat fee or rate, or a combination of any of the different types of fees or costs. In addition, the default price can be dependent on the particular requests or specific requirements set by a requester or a service provider. For example, the service can cost a certain amount (e.g., a default price) for different geographic locations, at different times, at different pickup or drop off locations, for types of vehicles requested, for different amounts of users riding the same vehicle, or a combination of any of the different requests or requirements. Depending on different implementations, the price adjustment 150 can adjust the price, relative to the default price, for any type of fee structure (e.g., by using a multiplier).

The price adjustment 150 can also use data provided by outside sources or other stored data from the system databases 140 to predict, approximate, or determine locations and amount of requesters and locations and amount of available service providers. For example, for different geographic regions, event information (such as location of the event, the time, the date, etc.) can be stored in an event database 140. Event information can be indicative of whether requests can be higher or lower at a certain time period (e.g., a time period before the event begins versus a time period when the event is ongoing), and can be indicative of whether there is a spike in demand for the service relative to the amount of available service providers. In another example, calendar information that indicates holidays, first days of school for a city, voting day, etc., can be used by the price adjustment 150. Other examples of outside sources or other stored data (current and/or historic) include weather conditions, news information (e.g., fires, emergency situations), social information (via social networking websites), traffic conditions, flight information from airports and/or airlines, etc., or other information that can assist in determining supply and/or demand for the service.

After the price has been adjusted, the price adjustment 150 can then provide the adjusted price 151 to the device interface 110 and the transaction component 160. The device interface 110 can transmit data corresponding to the adjusted price 161 over the network to one or more requesting devices 170 and/or one or more provider devices 180. The applications running on the devices can use the adjusted price data 161 to display on a user interface of the application the price adjustment to the requester(s) and the service provider(s), respectively. In this manner, the requesters and service providers can be notified of the current adjusted price (relative to the default price) so that the parties can choose to order the service and provide the service, respectively, at the adjusted price. The adjusted price data 161 can also provide information as to the duration the adjusted price is valid for as well as the reasoning for the price adjustment.

Once the price adjustment 150 adjusts the price at a given time, that price can be fixed for a duration of time. For example, the adjusted price can be valid for the service for five minutes or ten minutes before it changes for one or more requesters (or a group of requesters) and one or more service providers (or a group of service providers). During this duration, a requester (or group of requesters) can order the service and a service provider (or group of service providers) can agree to provide the service at the adjusted price. In some implementations, after the duration of time has passed, the price for the service can be adjusted again (e.g., the price adjustment 150 can perform another adjustment) or can be reset back to the default value.

In one example, the price adjustment 150 can also provide the adjusted price 151 to a system database 140, such as a pricing database or any other database discussed with respect to system 100, so that it can be stored and maintained as historical data. For example, the instance in time in which the price was adjusted (date and time) can be paired and stored with the adjustment in price (increased or decreased), the geographic location or area (e.g., a particular city), and the determined amount of requesters and available service providers. The price adjustment 150 can use the stored historical data with the adjusted price information, for example, in order to adjust the price for a service at a later time.

The price adjustment 150 also provides the adjusted price 151 to the transaction component 160 so that system 100 can charge an account of a requester and credit an account of a service provider at the adjusted price (during the duration in which the adjusted price is valid). When a requester interacts with her respective requesting device 170 to order the service, data corresponding to the request can be provided over the network to the device interface 110. The device interface 110 can notify one or more provider devices 180 (that qualify as a service provider for fulfilling the order or request) of the service request so that one or more service providers can choose to accept the order (e.g., provide information about the specifics the requester is requesting, such as the user's name and/or phone number, the pickup location, the type of vehicle, the destination, etc.). For example, a qualifying and available service provider can be a provider that is in the same geographic area (e.g., within the same neighborhood or city), and/or within a threshold distance or time away from the user, and/or can fulfill particular requirements or needs (amount of people a vehicle can carry, the type of vehicle, the destination), etc. One or more of the qualifying and available service providers can accept the order and provide a confirmation to the device interface 110 over the network.

Once the necessary service information is exchanged between system 100 and the parties engaged in the service, the device interface 110 then provides the transaction request 163 to the transaction component 160. The transaction request 163 notifies the transaction component 160 that a service has been arranged and a transaction has been entered into so that the transaction component 160 can handle the financial processing of the parties. The transaction component 160 implements the dynamically adjusted price 151 at the time of the transaction and interfaces with the financial institutions (e.g., banks, credit card companies, etc.) to charge an account associated with the requesting device 170 (e.g., the user's account) and credit an account associated with the provider device 180 (e.g., the service provider's account). In one variation, the transaction component 160 can also communicate with other components of system 100, such as the requester management 120 and the provider management 130, to verify and/or authenticate the requesters and service providers.

The transaction component 160 can charge/credit the accounts of the parties at the time of the transaction, during the time when service is being provided, after the service has been completed, or after one or both parties indicates completion of the service. A transaction confirmation 165 can be provided to the device interface 110 to indicate that the financial transaction (e.g., the crediting and/or the charging) was successful or unsuccessful. The device interface 110 can provide the transaction confirmation 165 to the requesting device 170 and/or the provider device 180. In one example, the device interface 110 can provide various messages and confirmations, such as the transaction confirmation 165, using different messaging transports, such as through text messages (e.g., SMS), email messages, instant messages, or messages used by the application(s) running on the respective devices (e.g., alerts). The transaction confirmation 165 can provide information detailing the service as well as the adjusted price (if any) that the parties agreed to operate under.

In some implementations, system 100 can also communicate with other third party services (not shown in FIG. 1) to provide updated pricing information. Other third party services can have the option to participate with the dynamic price adjustment system so that system 100 can enable services to be arranged between parties (e.g., other companies, entities, individuals, that are interested in requesting a service or providing a service).

Methodology

Figure 2A:
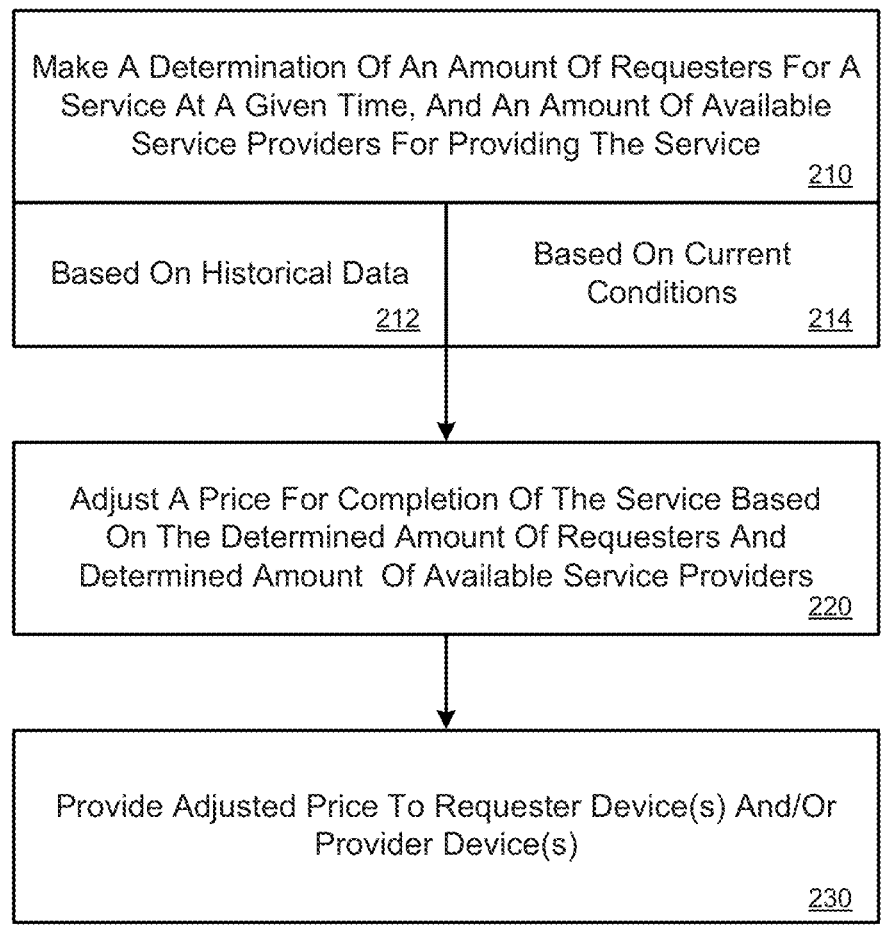
FIG. 2A illustrates an example method for adjusting prices for a service based on received data, according to an embodiment.

FIG. 2A illustrates an example method for adjusting prices for a service based on received data, according to an embodiment. A method such as described by an embodiment of FIG. 2A can be implemented using, for example, components described with an embodiment of FIG. 1. Accordingly, references made to elements of FIG. 1 are for purposes of illustrating a suitable element or component for performing a step or sub-step being described.

The price adjustment system makes a determination of an amount of requesters for a service at a given time in a given location (or region) and an amount of available service providers for providing the service (step 200). In some examples, the system can make the determinations based on historical data that has been stored and maintained in one or more databases (sub-step 212). For example, data previously provided by requester devices and provider devices can be stored with time/date and/or location information to indicate instances when requesters have requested the service and when service providers were available to satisfy service requests (for a given region or area). The system can make the determinations at a given time by retrieving historical data that is comparable (in time and location) to the given time. In one variation, the system can approximate the amount of requesters for the service and the amount of available service providers, and/or predict/forecast the amount of requesters for the service and the amount of available service providers for a future time using the historical data.

The system can also make the determinations based on current conditions (sub-step 214). The current conditions relating to the service requests and service providers can be based on recently received data provided by the requester devices and the provider devices. For example, data is received constantly and/or periodically in real-time (e.g., on the fly) from the requester devices and the provider devices whenever the respective users and service providers operate applications on their devices. If the system is scheduled or configured to adjust prices every five minutes, for example, the can use requester data and provider data received during a prior five minute duration (or prior fifteen minutes or thirty minutes, etc.) to determine current conditions (e.g., device locations, destinations, states of service providers, specific requests, etc.).

Once the amount of requesters and the amount of available service providers are determined, a price can be adjusted for the service (relative to a default price) based on the determined amounts (and determined device locations) (step 220). The price can be adjusted based on one or more rules and/or models. For example, if the system determines that the amount of requesters significantly exceeds the amount of available service providers (e.g., demand is much higher than supply), the price for the service can be increased by an amount or by a multiplier. In another example, a model can be based on utilization percentages to determine the amounts or multipliers of price adjustments.

The adjusted prices are provided to the requester devices and/or the provider devices (step 230). The applications that are running on the requester and provider devices can use data corresponding to the adjusted prices in order to display a pricing user interface (as part of the application) to the respective users and service providers. The requesters and service providers can be notified of the current adjusted price (relative to the default price) so that the parties can choose to order the service and provide the service, respectively, at the adjusted price. The one or more requesters can order the service at the adjusted price (by interacting with the application) and one or more service providers can accept the order to fulfill the service request (again, by interacting with the application). In this manner, the price adjustment system can arrange services between parties and dynamically adjust the prices for the services.

Figure 2B:
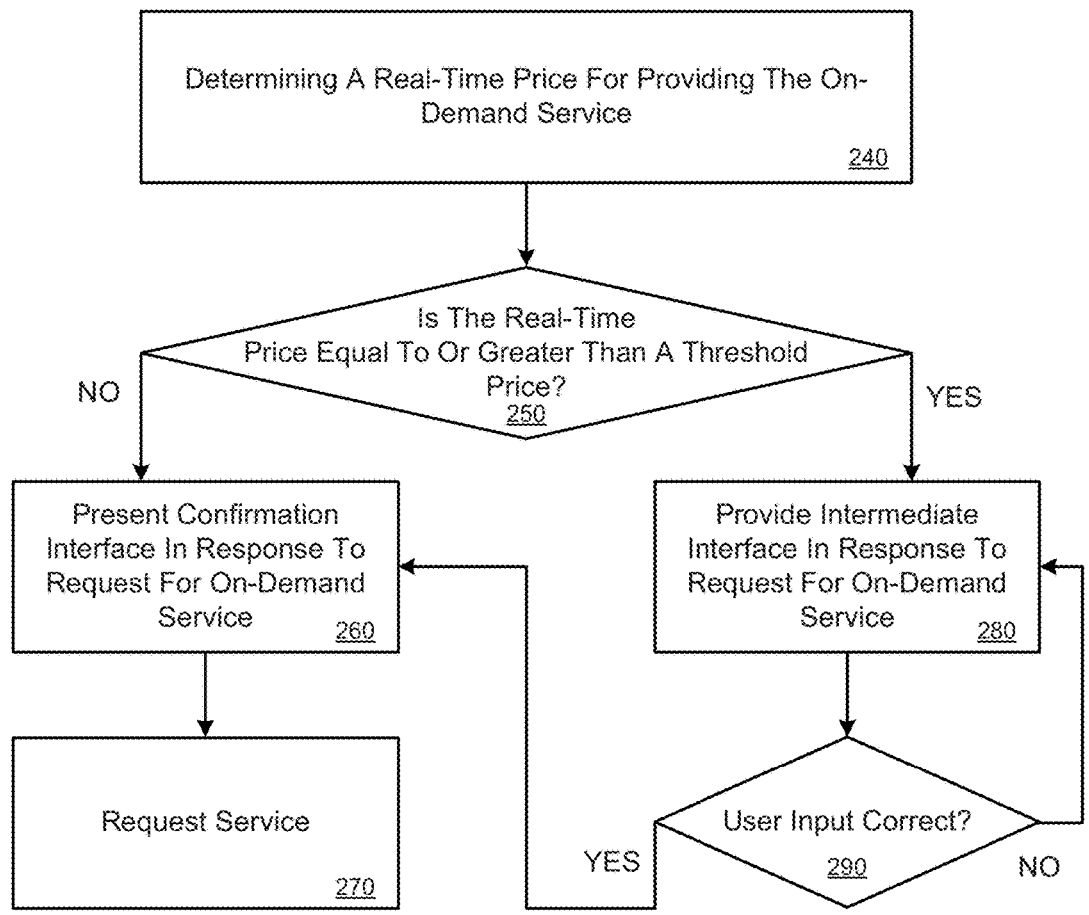
FIG. 2B illustrates an example method for enabling a user to verify a price change for an on-demand service, under an embodiment.

FIG. 2B illustrates an example method for enabling a user to verify a price change or a real-time price for an on-demand service, under an embodiment. A method such as described by an embodiment of FIG. 2B can be implemented using, for example, components described with an embodiment of FIG. 1. Accordingly, references made to elements of FIG. 1 are for purposes of illustrating a suitable element or component for performing a step or sub-step being described.

Depending on implementation, the method described in FIG. 2B can be performed on a computing device, such as a requesting device 170 that is operated by a user requesting an on-demand service. For example, a processor of the requesting device 170 can operate an application that communicates with a service system (such as system 100 of FIG. 1) to perform one or more steps described in FIG. 2B. The computing device can determine a real-time price for providing the on-demand service for the user (240). The real-time price can be a default price or a price that is set based on the user's current location. In some cases, such as discussed with FIG. 1 and FIG. 2A, a real-time price for an on-demand service can be adjusted (e.g., increased or decreased) based on current conditions.

The computing device can determine the real-time price by communicating with a service system, which can dynamically adjust a real-time price for an on-demand service. For example, the application running on the computing device can receive a wireless communication from the service system that indicates that the real-time price has increased or decreased. The real-time price can correspond to a flat amount, an amount per time spent during performance of the service, and/or an amount per distance traveled (e.g., mile) during performance of the service. The real-time price can also be represented as a multiplier of a standard price or default price for the on-demand service (e.g., represented as 1.5×, 2×, or 5× the default price).

Once the real-time price is determined, the computing device can determine whether the real-time price is equal to or greater than a threshold (or threshold price) (250). Depending on the type of real-time price, the threshold or threshold price can be a flat amount threshold (e.g., $30 for the service), a rate (per time or distance) threshold (e.g., $4 per min, or $8 per mile), and/or a multiplier threshold (e.g., 4× default price). For example, the real-time price for providing the service can be determined to be four times (4×) the default price, while the threshold can be a multiplier representing three times (3×) the default price. The computing device can compare the real-time price with a threshold price (e.g., that stored in a memory of the computing device and/or received from the service system) in order to determine whether the real-time price is equal to or greater than the threshold. In one example, the threshold can be configured by the user via one or more settings of the application or the computing device, and/or an administrator of the service system. In the latter case, when the threshold is adjusted, the service system can communicate the threshold to the computing device.

In some examples, if the real-time price is less than the threshold, the user can request the on-demand service by navigating through one or more user interfaces, such as a confirmation user interface, without answering a question or prompt that relate to the real-time price (260). The computing device can then provide the service request to the service system (e.g., wirelessly transmit a service request) in response to a user request (270). On the other hand, if the real-time price is greater than or equal to the threshold, when the user requests the on-demand service, an intermediate user interface is provided that the user is to correctly respond to before the user can make a request for the on-demand service (280). The intermediate user interface can provide a prompt or one or more questions that pertain to the real-time price for the user to correctly answer.

According to various examples, the intermediate user interface can instruct or request the user to confirm the real-time price, or request the user to answer one or more questions. A text field can be provided to receive one or more characters that are inputted by the user (e.g., via one or more input mechanisms, microphone, etc.). For example, the intermediate user interface can provide a prompt that states, "Type 5.0 to confirm the surge rate," and the text field for the user to input the characters "5.0." In another example, the application running on the computing device can display a sequence of intermediate user interfaces that each includes a question (e.g., three questions on three interfaces) that must each be answered correctly, one after another. As an addition or an alternative, the service system can determine which intermediate user interface is to be displayed by the application (e.g., single prompt vs. multiple questions in one interface or in sequential interfaces).

If the user's input is incorrect, the user is prevented from communicating a request for the service to the service system. In one example, the intermediate interface can continue to be displayed with a graphic or text indicating that the user's input was incorrect. In other examples, other user interfaces can be presented to the user (e.g., the home page interface for the application, a frequently asked questions interface, a contact service system interface, etc.) to provide the user with additional guidance. If the user's input is correct, however, the user can then request the on-demand service by navigating through one or more user interfaces, such as a confirmation user interface (260). In this manner, when the real-time price has increased significantly (e.g., such as to be above a threshold price), a safeguard can be provided to the user so that the user can fully understand and recognize the increase in the real-time price before finalizing a request for the on-demand service.

User Interface Examples

Figures 3A, 3B:
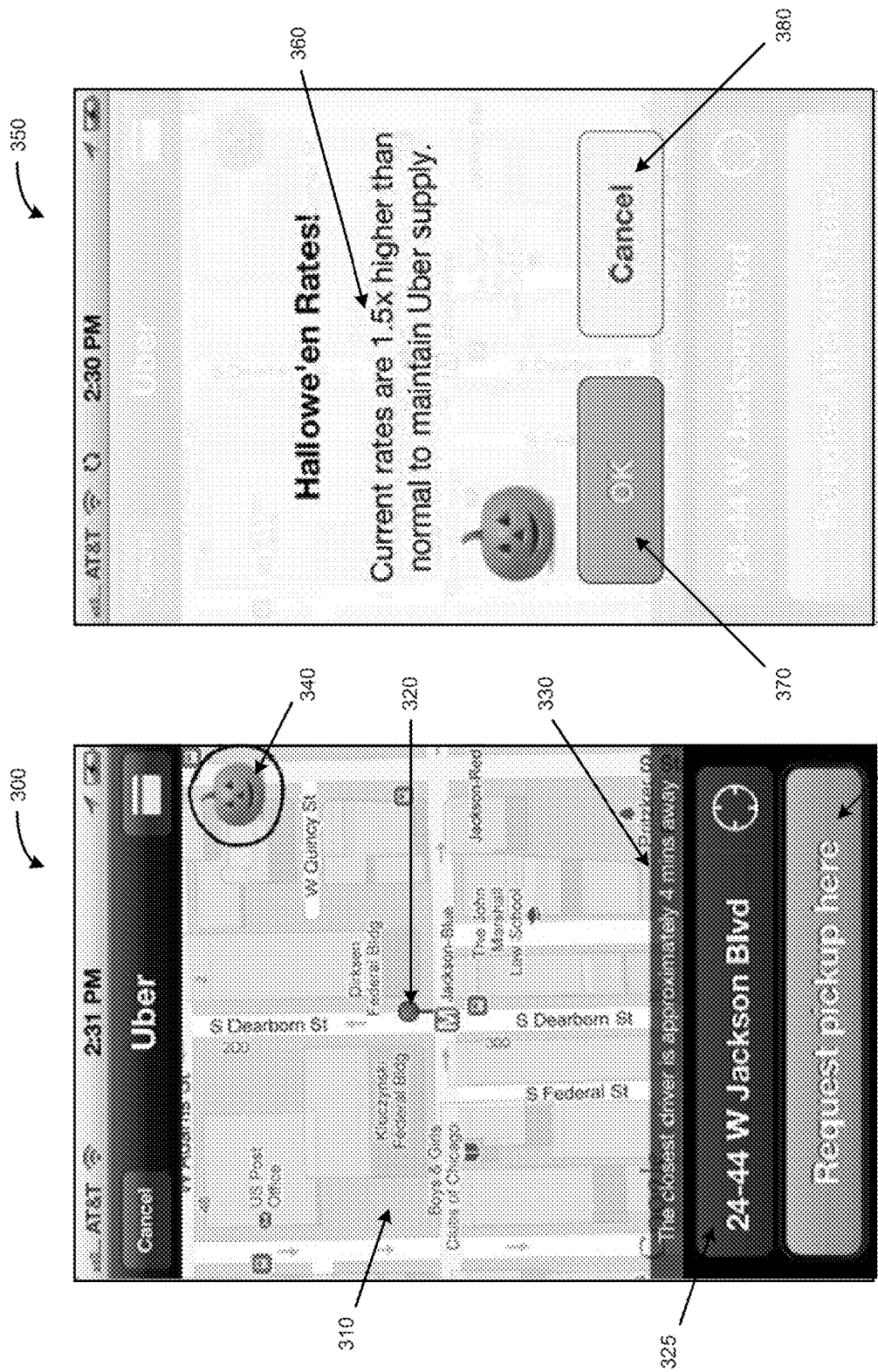
FIGS. 3A and 3B illustrate an example series of user interfaces that are displayed to a customer that requests a service, according to an embodiment.

FIGS. 3A and 3B illustrate an example series of user interfaces that is displayed to a customer that requests a service, according to an embodiment. The user interfaces 300, 350 illustrate various user interfaces that can be provided by a service application running or being operated on a requester device (e.g., a smart phone) and/or a provider device. Such an application can be provided by an entity that enables a service (such as a entertainment service or food truck service) to be arranged between parties and also operates the price adjustment system (as described with FIG. 1). For example, a user can download and install the application on his or her device, and register the device (e.g., the requester device) with system 100. The user can also create an account to be able to request services (e.g., provide a user name, password, address information, credit card information, etc.). The stored application can enable data to be exchanged between the application (and device) and system 100 so that the user can interact with system 100 and request services.

When a user launches and operates the service application, a variety of different user interfaces can be provided on the display of the device depending on the different stages or steps during the request process. For example, the service application can first display a log in user interface where a user must first enter in a user name (or other user identifier, such as an email address) and a password in order to log in to the application and to be able to interact with system 100. After logging in, the service application can display a user interface 300 that illustrates the current location of the user (e.g., by using resources of the device, such as a global position system (GPS) of the device). In one implementation, a map 310 can be provided showing a geographic region or area that the user (and user's device) is currently located at. The current location of the device can be indicated with a graphic 320. In another example, the user interface 300 can also provide a location identifier 325 of the current location (e.g., an address, a latitude/longitude, a name of the area, or a name of the building or store, etc.).

The user interface 300 can also provide information about the available service providers that are proximate to the current location of the user. For example, the user interface 300 can provide service provider information 330 indicating how far the nearest available service provider is from the user (e.g., in terms of distance or time). In some variations, the map 310 can also illustrate one or more graphics (not shown in FIG. 3A) showing the current location of one or more available service providers. The user can interact with the map 310 to change view (e.g., zoom in or zoom out) or pan (e.g., move the map left, right, up, down, etc.) to see the current location of the available service providers, and select one or more graphics to obtain additional information about the selected available service provider (e.g., where the available service provider is, who the service provider is, what kind of vehicle the service provider is driving, etc.).

By operating the service application, the user can order the service by selecting on a feature 335 for requesting the service (e.g., request a pickup for a transportation service, or request a dessert food service, such as ice cream trucks). The user interface 300 can also provide a selectable graphic 340 that indicates that the price for the service has been adjusted (e.g., as a result of system 100 adjusting the price for the service, as described with respect to FIGS. 1 and 2A). In one implementation, when the price has been adjusted, the graphic 340 can be an image that can be changed in order to better indicate current conditions. For example, the graphic 340 does not have to appear on the user interface 300 if the price has not been adjusted by system 100, the graphic 340 can be a default graphic (e.g., a dollar symbol), or the graphic 340 can be changed to a graphic based on the current date and/or time (e.g., a U.S. flag representing the Fourth of July or a pumpkin representing Halloween, etc.). When the user selects the graphic 340 (and/or requests pickup by selecting the feature 335), additional information about the adjusted price can be provided on a pricing user interface 350 (as illustrated in FIG. 3B).

For example, the pricing user interface 350 indicates to the user that the price has been adjusted (e.g., increased or decreased) relative to the default price and can provide a reason for the adjustment. The pricing user interface 350 can inform the user of the adjustment by using a multiplier 360 that indicates the amount the price has been adjusted (e.g., 1.5 times the default price or 0.5 times the default price). The pricing user interface 350 can also provide a selectable feature 370 that enables a user to continue with the request for the service (e.g., at the adjusted price) and/or a selectable feature 380 that enables the user to cancel the request for the service. If the user selects the feature 370 to continue with the request, the application transmits the request to system 100 for processing and system 100 enables the service to be arranged between the user and one or more service providers.

Figure 4A:
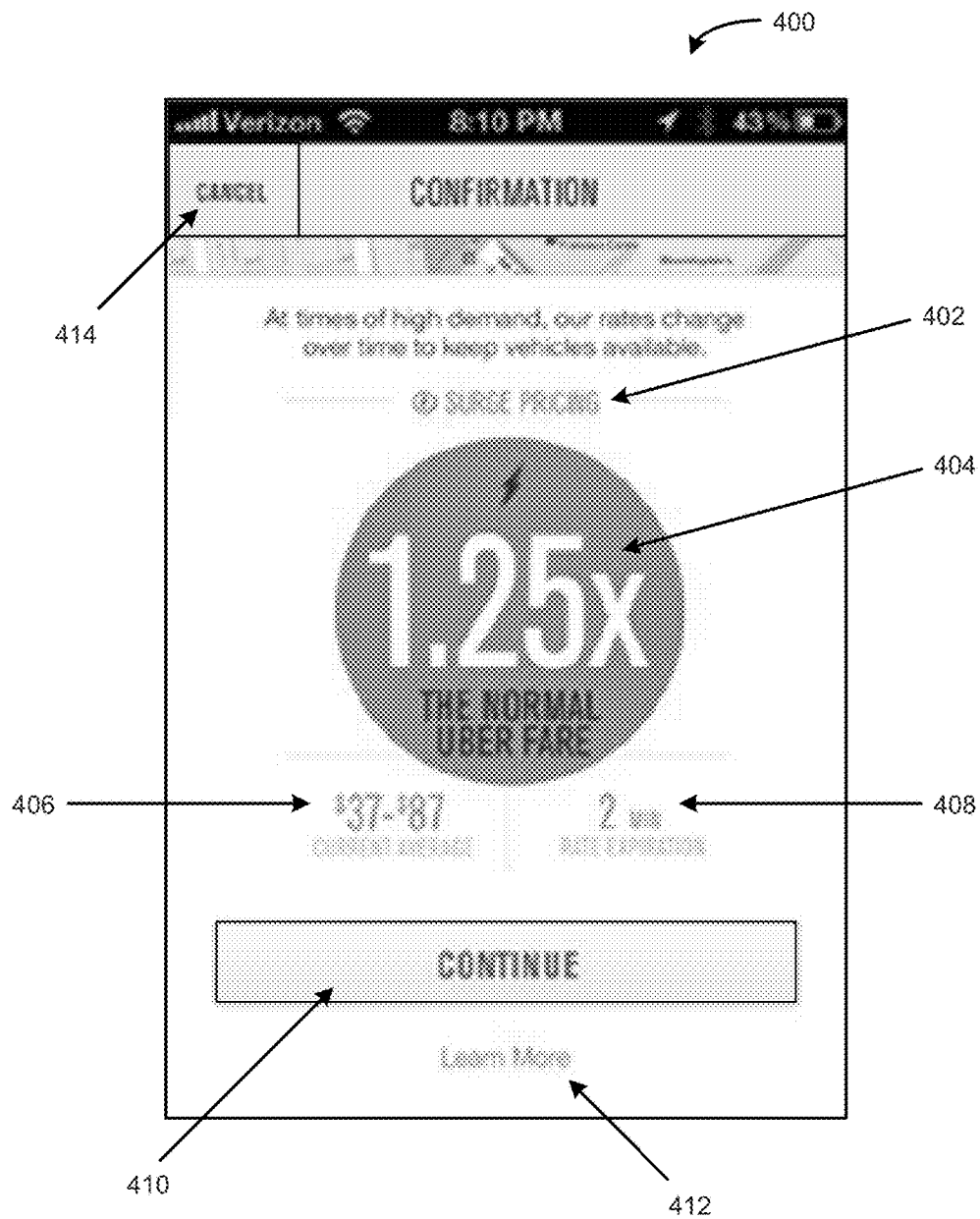
FIG. 4A illustrates an example user interface that is displayed to a customer that requests a service using an adjusted price, under another embodiment.

FIG. 4A illustrates another example user interface that is displayed to a customer that requests a service, under another embodiment. The user interface illustrates a pricing user interface 400 (e.g., similar to the pricing user interface 350 of FIG. 3B) that indicates that the price for a service has been adjusted relative to a default price. For example, the pricing user interface 400 can be provided on a display of a user's (or service provider's) computing device when a service application is operated by the user. The pricing interface 400 includes a feature 402, such as a graphic and/or text, that indicates to the user that the price for the service has been adjusted. The pricing user interface 400 can also provide a reason for the price adjustment.

The pricing user interface 400 provides another feature or pricing indication 404, such as a graphic and/or text, that informs that user of the amount of the pricing adjustment relative to the default price (e.g., increased or decreased).

The service application that provides the pricing user interface 400 can use the adjusted price data (e.g., the adjusted price data 161 provided by system 100 in FIG. 1) to display the pricing indication 404. The pricing indication 404 can provide a multiplier (e.g., 1.25×) that indicates the amount the price has been adjusted (e.g., the adjusted price is 1.25 times the default price). In some variations, the pricing interface 400 can also include an approximate price range 406 that informs the user of the approximate cost for the service based on the adjusted price (e.g., the current average or range of price). The pricing interface 400 can also include a timer or duration of time 408 that informs the user that the adjusted price expires after a certain amount of time. Once the amount of time has surpassed, the adjusted price can be increased further (e.g., 1.5×) or decreased based on current conditions and/or historical data.

The pricing user interface 400 also provides a variety of selectable features that the user can select for performing different actions (e.g., tap on the selectable features on a touch-sensitive display of the computing device). In one example, the pricing user interface 400 can include a selectable feature 410 (e.g., "Continue") that enables a user to continue with the request for the service (e.g., at the adjusted price). The pricing user interface 400 can also include a selectable feature 412 that, when selected by the user, provides additional information about the adjusted price and/or general information about dynamic pricing (e.g., via a different user interface or a pop-up user interface that overlays the pricing user interface 400). The pricing user interface 400 also includes a selectable feature 414 that enables the user to cancel the request for the service. If the user selects the feature 410 to continue with the request, the application transmits the request to system 100 for processing and system 100 enables the service to be arranged between the user and one or more service providers.

FIGS. 4B through 4G illustrate example user interfaces that can be displayed to enable a user to verify a price change or real-time price, according to an embodiment. The user interfaces described in FIGS. 4B through 4G can be provided by a service application running on a requester computing device. The user interfaces are described with respect to a transport service for exemplary purposes.

Figure 4B:
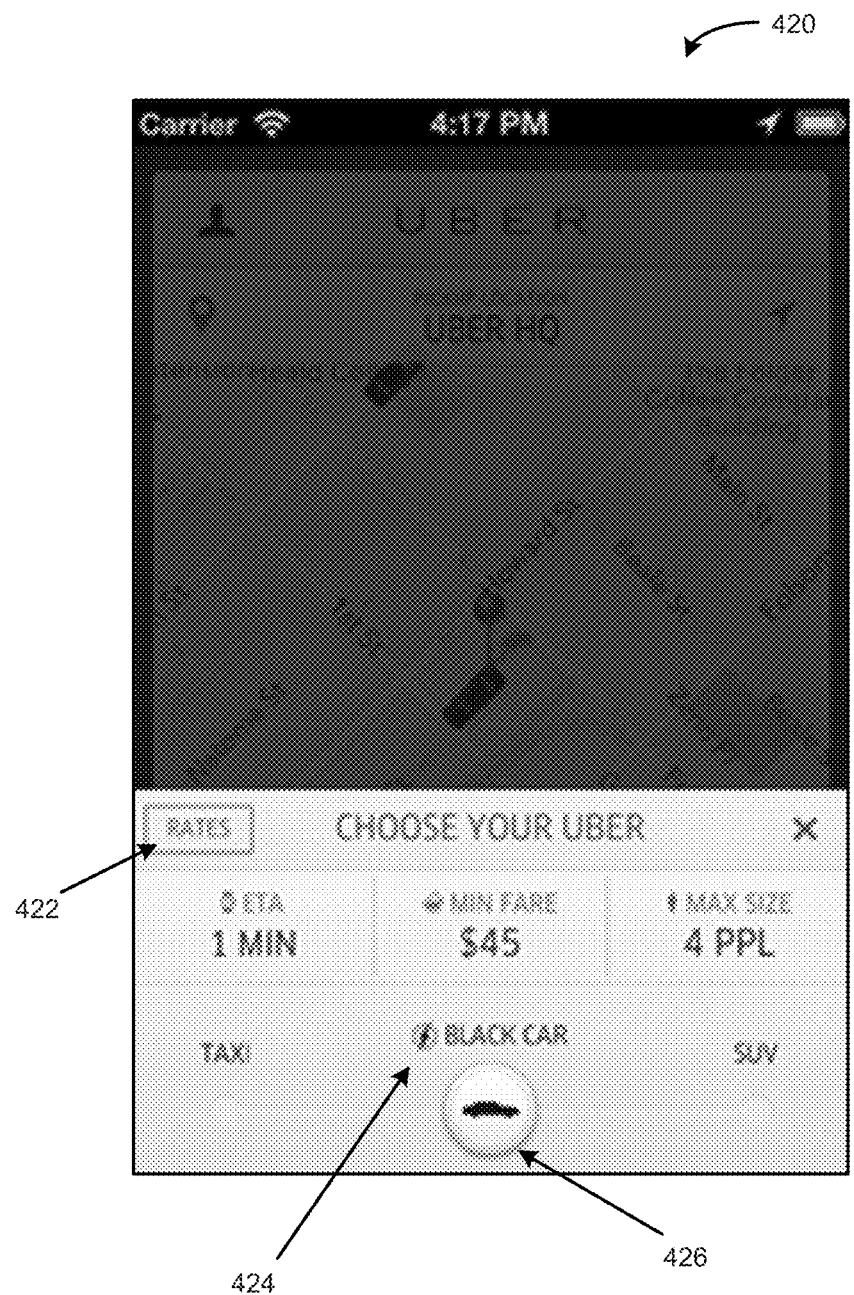
FIGS. 4B through 4G illustrate example user interfaces that can be displayed to enable a user to verify a price change, according to an embodiment.

A service request interface 420 of FIG. 4B can enable a user to select a particular vehicle for requesting a transport service. Before making the request, the user can view details about a particular vehicle, such as a taxi, a black car or sedan, or an SUV, and its estimated time of arrival to the user's location and its minimum fare. The user can also select a feature 422 for viewing details about the rates for the selected vehicle type, as indicated by a selection feature 426. The service request interface 420 can also provide a graphic indicator 424 that represents to the user that the real-time price for the transport service has been adjusted (e.g., increased). In some cases, the graphic indicator 424 can indicate the price increase for one or more particular types of vehicle but not for another type(s), such as for the black car but not the taxi or SUV (as evidenced by the lack of the graphic indicator 424 for the taxi and the SUV vehicle types). The minimum fare or estimated fare can also be adjusted to reflect the real-time price or rate.

Figure 4C:

A pricing user interface 430 of FIG. 4C (e.g., similar to the pricing user interface 350, 400 of FIG. 3B or 4A) can also be presented on the display of the computing device to provide additional information about the real-time pricing. In one example, the pricing user interface 430 can be displayed in response to a user input to request the transport service or in response to the user selecting the feature 422 of FIG. 4B. The pricing user interface 430 can include a pricing indicator 432 that includes a plurality of different pricing information. For example, the pricing information can include a multiplier as compared to the "normal" fare or default price (e.g., 3.0× more), a minimum fare amount, a price per time spent, and/or a price per distance traveled, that corresponds to the adjusted real-time price.

For example, based on the multiplier, 3×, the pricing information reflects that the minimum fare has increased from $15 to $45, while the rate pricing has increased from $1.25/min to $3.75/min and from $4.90/mile to $14.70/mile. The real-time price information is displayed to the user so that the user can understand the price increase and the obligation to pay the required price for the on-demand service. If the user accepts the higher price, the user can select the accept feature 436. If the user does not accept, the user can close the application or select the "x" feature to cancel out of the request. In some cases, if the user does not perform any action and a duration of time elapses (such as the time 434 displayed), the real-time price can expire.

As discussed in FIG. 2B, an application running on the computing device can determine the real-time price for the transport service, and compare the real-time price with a threshold price. Depending on implementation, the computing device can make the determination whether the real-time price is greater than or equal to the threshold price at different times. For example, the application can determine the real-time price and/or make the real-time price and threshold price comparison (i) when the application is launched or opened, (ii) when the application first communicates with the service system after being launched, and/or (iii) when the user makes a service request on any of the interfaces described in FIGS. 3A through 4C.

Figure 4D:
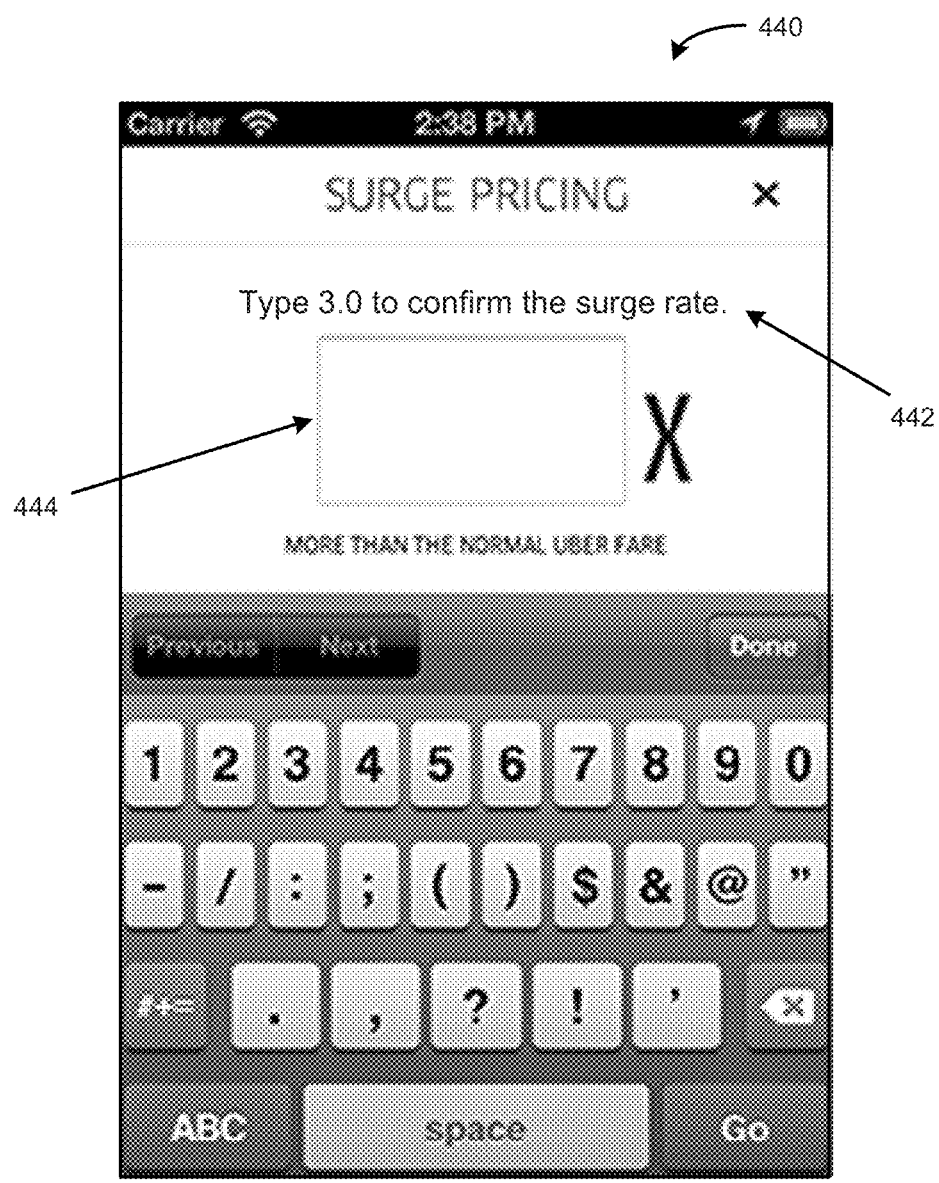
Figure 4E:
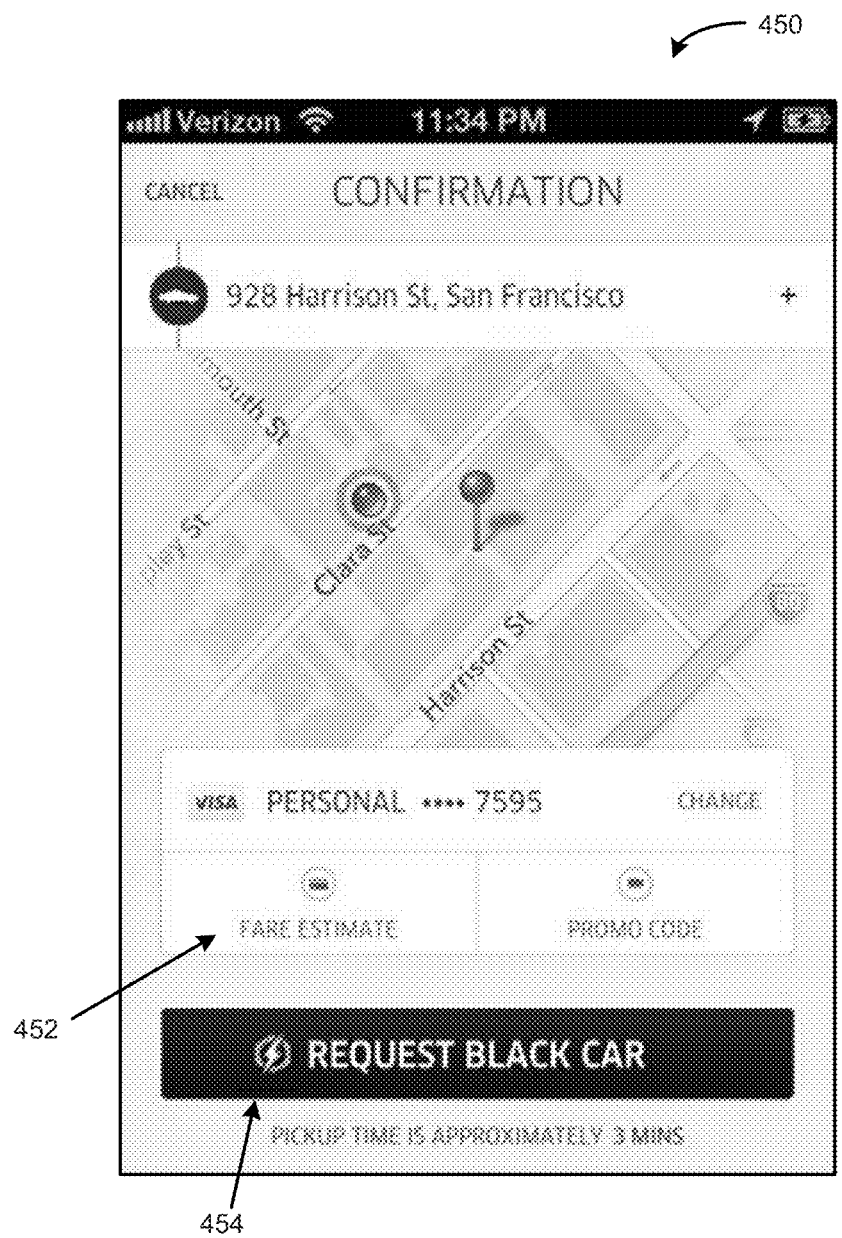

If the real-time price is greater than or equal to the threshold price, the application can provide an intermediate user interface 440 to the user, as illustrated in FIG. 4D. On the other hand, if the real-time price is less than the threshold price, the application can provide a confirmation user interface 450, as illustrated in FIG. 4E. For example, the threshold can be set as 2.5 times the default or normal price, and the real-time price can be three times the default price. The application can present the intermediate user interface 440 in response to the real-time price being greater than or equal to the threshold price and the user requesting the service. In one example, the user can select the accept feature 436, such as described in FIG. 4C, to request the transport service.

The intermediate user interface 440 can include a prompt 442 or one or more questions pertaining to the price increase, and a text field or input field 444 to receive one or more characters inputted by the user. The user can verify that the user recognizes the price increase by entering the correct answer to the prompt or question(s) before a service request can be made to the service system. If, for example, the user does not input "3.0" to confirm the surge rate or increased real-time price, the user can be prevented from requesting the transport service. In this manner, the intermediate user interface 440 provides a security measure or precaution for the user before the user accepts a much higher price when requesting the transport service.

Once the user answers the prompt or question(s) correctly (e.g., passes the pricing sobriety test), a confirmation user interface 450 of FIG. 4E can be presented to enable the user to confirm the information provided for the transport service and request the service. The user can select the request feature 454 to request the transport service. The application can transmit the service request to the transport service system using the information provided by the user for the transport service. The confirmation user interface 450 can also provide a fare estimate feature 452 that the user can select to view the estimated fare for the transport service based on the real-time price.

Figure 4F:
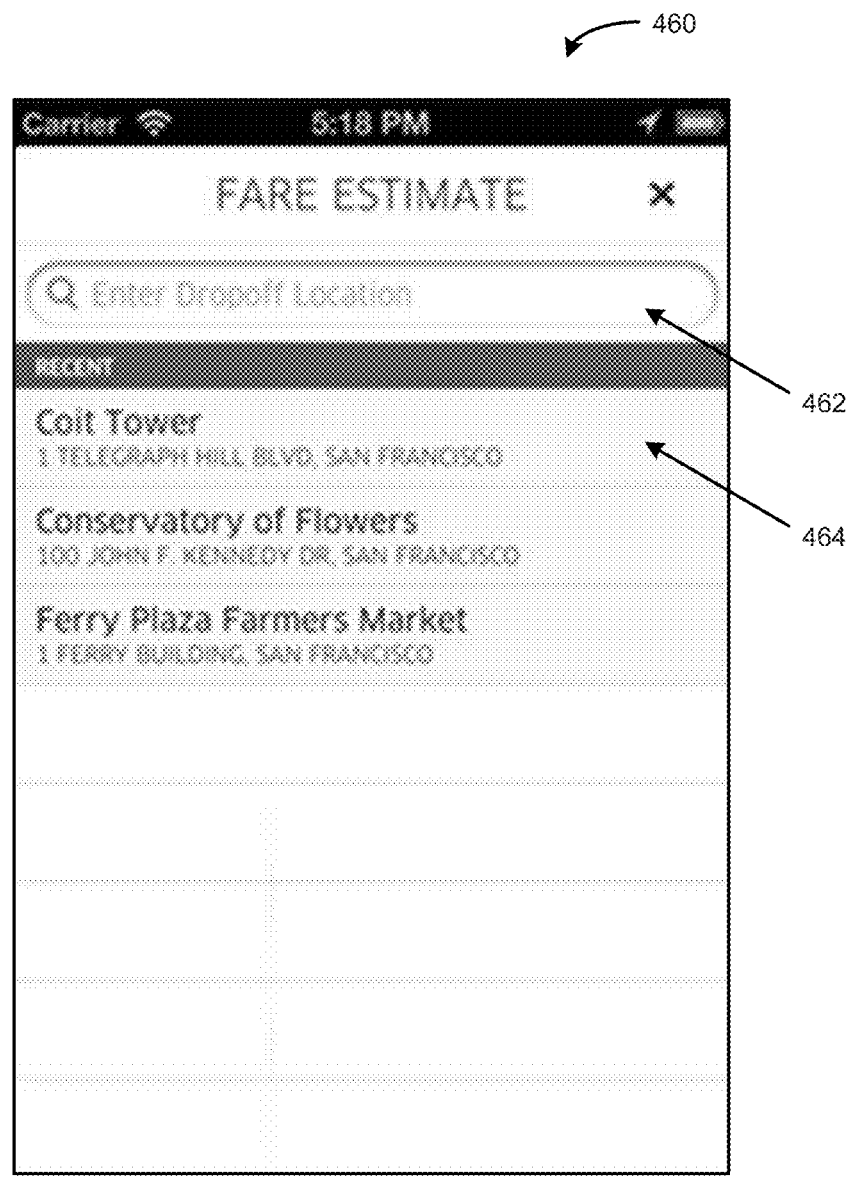
Figure 4G:
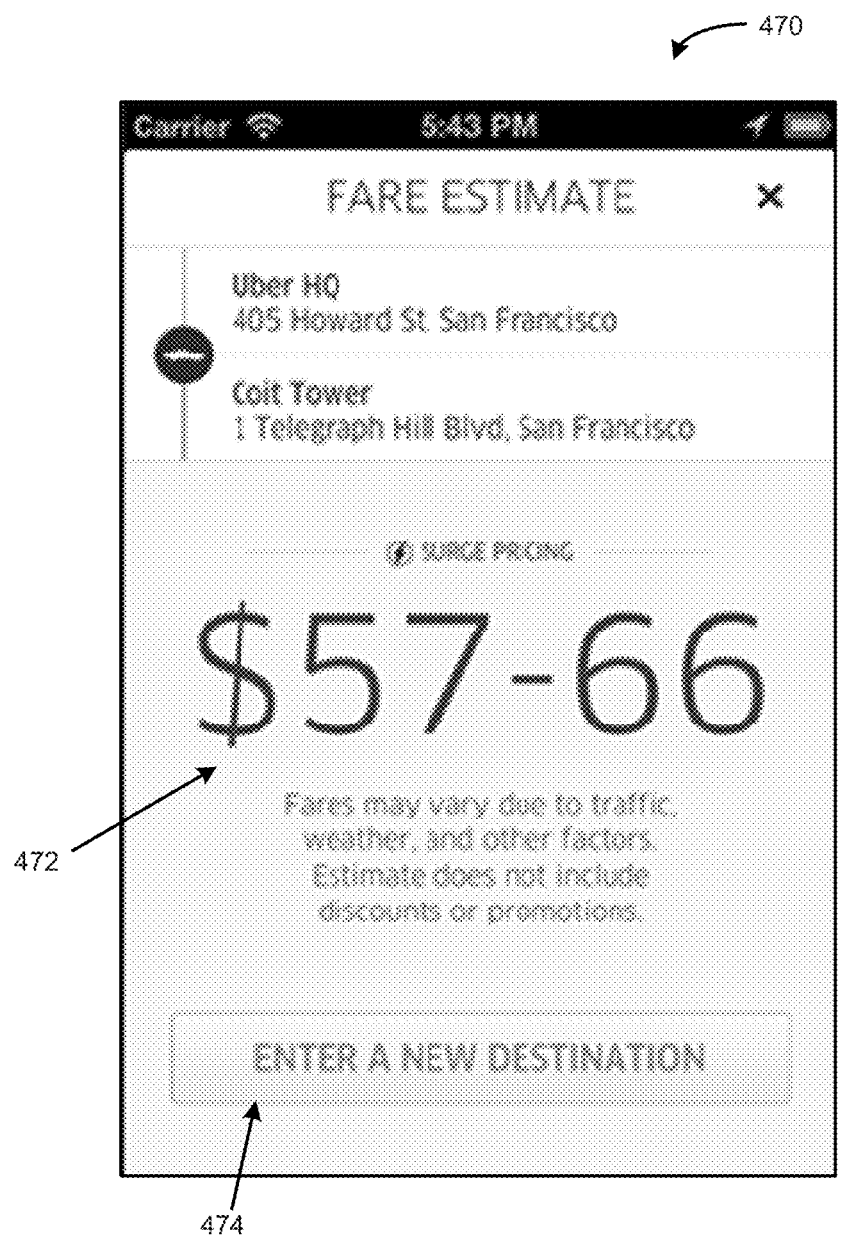

For example, if the user selects the fare estimate feature 452, a fare estimate user interface 460 can be provided, as illustrated in FIG. 4F. The fare estimate user interface 460 can enable a user to input a drop off location 462 (e.g., by inputting a city, region, address, etc.) or select a drop off location 464 previously used recently by the user. Based on the current location or pick up location designated by the user, the drop off location, and the current real-time price, the application on the computing device can calculate and display the estimated fare 472 as part of the fare estimate user interface 470 of FIG. 4G. The user can estimate other fares by changing the destination via interactions with additional features 474.

Hardware Diagrams

Figure 5:
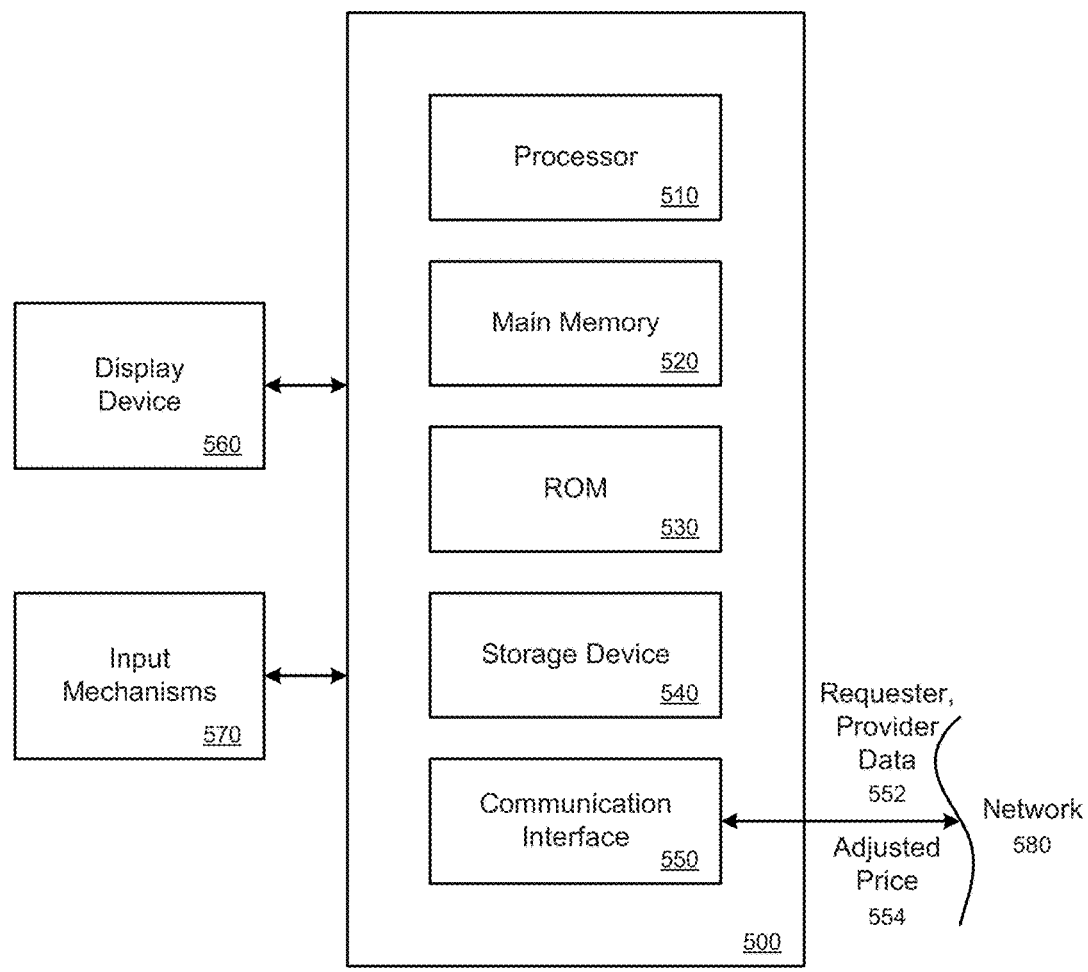
FIG. 5 is a block diagram that illustrates a computer system upon which embodiments described herein may be implemented.

FIG. 5 is a block diagram that illustrates a computer system upon which examples described herein may be implemented. For example, in the context of FIG. 1, system 100 may be implemented using a computer system such as described by FIG. 5. System 100 may also be implemented using a combination of multiple computer systems as described by FIG. 5.

In one implementation, computer system 500 includes processing resources 510, main memory 520, ROM 530, storage device 540, and communication interface 550. Computer system 500 includes at least one processor 510 for processing information. Computer system 500 also includes a main memory 520, such as a random access memory (RAM) or other dynamic storage device, for storing information and instructions to be executed by the processor 510. Main memory 520 also may be used for storing temporary variables or other intermediate information during execution of instructions to be executed by processor 510. Computer system 500 may also include a read only memory (ROM) 530 or other static storage device for storing static information and instructions for processor 510. A storage device 540, such as a magnetic disk or optical disk, is provided for storing information and instructions.

The communication interface 550 can enable the computer system 500 to communicate with one or more networks 580 (e.g., cellular network) through use of the network link (wireless or wireline). Using the network link, the computer system 500 can communicate with one or more computing devices, and one or more servers. In some variations, the computer system 500 can be configured to receive requester data and/or provider data 552 from one or more computing devices (e.g., belonging to users and service providers, respectively) via the network link. The requester data and/or provider data 552 can be processed by the processor 510 and can be stored in, for example, the storage device 540. The processor 510 can process the received data (and other data, such as historical data) in order to adjust the price for a service relative to a default price. The adjusted price data 554 can be transmitted to the requester device(s) and/or the provider device(s) over the network 580.

Computer system 500 can also include a display device 560, such as a cathode ray tube (CRT), an LCD monitor, or a television set, for example, for displaying graphics and information to a user. An input mechanism 570, such as a keyboard that includes alphanumeric keys and other keys, can be coupled to computer system 500 for communicating information and command selections to processor 510. Other non-limiting, illustrative examples of input mechanisms 570 include a mouse, a trackball, touch-sensitive screen, or cursor direction keys for communicating direction information and command selections to processor 510 and for controlling cursor movement on display 560.

Examples described herein are related to the use of computer system 500 for implementing the techniques described herein. According to one embodiment, those techniques are performed by computer system 500 in response to processor 510 executing one or more sequences of one or more instructions contained in main memory 520. Such instructions may be read into main memory 520 from another machine-readable medium, such as storage device 540. Execution of the sequences of instructions contained in main memory 520 causes processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
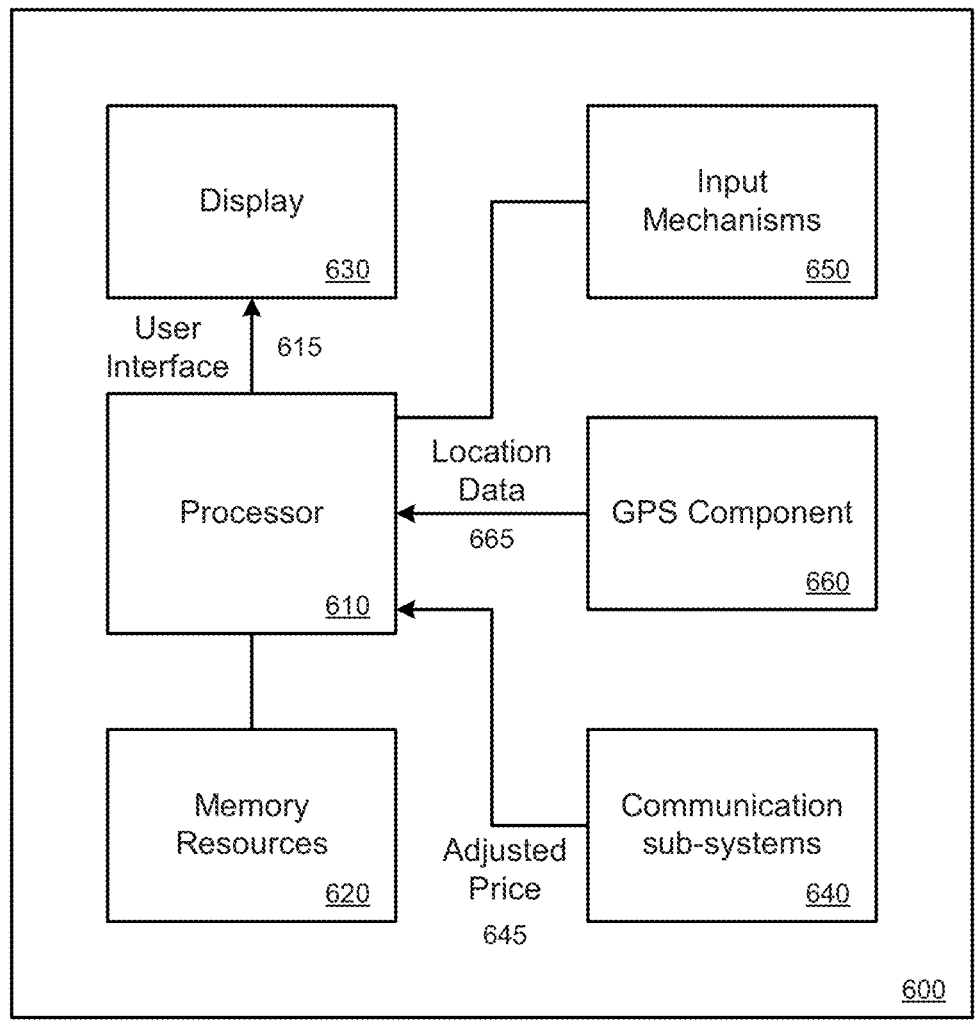
FIG. 6 is a block diagram that illustrates a mobile computing device upon which embodiments described herein may be implemented.

FIG. 6 is a block diagram that illustrates a mobile computing device upon which examples described herein may be implemented. In one embodiment, a computing device 600 may correspond to a mobile computing device, such as a cellular device that is capable of telephony, messaging, and data services. Examples of such devices include smartphones, handsets or tablet devices for cellular carriers. Computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), and one or more location detection mechanisms (e.g., GPS component) 660. In one example, at least one of the communication sub-systems 640 sends and receives cellular data over data channels and voice channels.

The processor 610 is configured with software and/or other logic to perform one or more processes, steps and other functions described with implementations, such as described by FIGS. 1 through 4G, and elsewhere in the application. Processor 610 is configured, with instructions and data stored in the memory resources 620, to operate a service application as described in FIGS. 1 through 4G. For example, instructions for operating the service application in order to display various user interfaces, such as described in FIGS. 3A through 4G, can be stored in the memory resources 620 of the computing device 600. A user can operate the service application so that location data 665 can be received by the GPS component 660. The location data 665 can provide the current location of the computing device 600 that can be used by system 100 (as described in FIG. 1) in arranging the service and in providing adjusted pricing (if any). The communication sub-systems 640 can receive adjusted price data 645 over a network from system 100 and provide the adjusted price 645 to the processor 610 for displaying the adjusted price to the user.

The processor 610 can provide content to the display 630 by executing instructions and/or applications that are stored in the memory resources 620. In some examples, user interfaces 615 can be provided by the processor 610 based on the adjusted or real-time price 645, such as a pricing user interface, an intermediate user interface, etc., as described with FIGS. 3A through 4G. While FIG. 6 is illustrated for a mobile computing device, one or more embodiments may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the examples are not limited to those precise descriptions and illustrations. As such, many modifications and variations will be apparent to practitioners. Accordingly, it is contemplated that a particular feature described either individually or as part of an example can be combined with other individually described features, or parts of other examples, even if the other features and examples make no mentioned of the particular feature.

What is claimed is:

1. A method for enabling a user to request an on-demand transport service on a computing device, the method being performed by one or more processors and comprising:
   determining a default price for the on-demand transport service to transport the user from a current location to a destination location;
   determining a real-time price for the on-demand transport service to transport the user from the current location to the destination location;
   determining that the real-time price is equal to or exceeds a threshold value, wherein the threshold value is the default price adjusted by a first multiplier;
   providing, on the computing device of the user, the real-time price for the on-demand transport service; and
   in response to a service request from the user for the on-demand transport service when the real-time price is equal to or exceeds the threshold value, providing, on the computing device of the user, an intermediate interface to receive a user input; and
   determining whether to arrange the on-demand transport service for the user based on the user input.

2. The method of claim 1, wherein the real-time price is a flat fee.

3. The method of claim 1, wherein determining the real-time price includes increasing the default price by a second multiplier.

4. The method of claim 3, further comprising:
   providing a user interface to enable the user to make the service request, the user interface including a graphic that identifies the second multiplier.

5. The method of claim 1, wherein determining the real-time price includes determining a price per distance traveled and a price per time spent for transporting the user from the current location to the destination location.

6. The method of claim 1, wherein the intermediate interface includes a prompt that requests the user to input one or more characters in a text field of the intermediate interface.

7. The method of claim 6, further comprising:
   receiving, in the text field of the intermediate interface, one or more characters that are inputted by the user; and
   in response to receiving the one or more characters, making a determination as to whether the one or more characters are a correct response to the prompt.

8. The method of claim 1, wherein the intermediate interface includes one or more questions pertaining to the real-time price.

9. The method of claim 1, further comprising:
   making a determination as to whether the user correctly responded to the intermediate interface.

10. The method of claim 9, wherein in response to making the determination that the user correctly responded to the intermediate interface, enabling the user to confirm the service request.

11. The method of claim 10, wherein enabling the user to confirm the service request includes providing a confirmation interface to the user in response to making the determination that the user correctly responded to the intermediate interface.

12. A computing system comprising:
    one or more processors;
    a memory to store a set of instructions;
    wherein the one or more processors access the set of instructions to cause the computing system to:
       determine a default price for an on-demand transport service to transport a user from a current location to a destination location;
       determine a real-time price for the on-demand transport service to transport the user from the current location to the destination location;
       determine that the real-time price is equal to or exceeds a threshold value, wherein the threshold value is the default price adjusted by a first multiplier;
       provide, on a computing device of the user, the real-time price for the on-demand transport service; and
       in response to a service request from the user for the on-demand transport service when the real-time price is equal to or exceeds the threshold value, provide, on the computing device of the user, an intermediate interface to receive a user input; and
       determine whether to arrange the on-demand transport service for the user based on the user input.

13. The computing system of claim 12, wherein the real-time price is a flat fee.

14. The computing system of claim 12, wherein the one or more processors determine the real-time price by increasing the default price by a multiplier.

15. The computing system of claim 12, wherein the one or more processors determine the real-time price by determining a price per distance traveled and a price per time spent for transporting the user from the current location to the destination location.

16. A non-transitory computer-readable medium that stores instructions, which when executed by one or more processors of a computing system, cause the computing system to perform operations that include:
    determining a default price for an on-demand transport service to transport a user from a current location to a destination location;
    determining a real-time price for the on-demand transport service to transport the user from the current location to the destination location;
    determining that the real-time price is equal to or exceeds a threshold value, wherein the threshold value is the default price adjusted by a first multiplier;
    providing, on a computing device of the user, the real-time price for the on-demand transport service; and
    in response to a service request from the user for the on-demand transport service when the real-time price is equal to or exceeds the threshold value, providing, on the computing device of the user, an intermediate interface to receive a user input; and
    determining whether to arrange the on-demand transport service for the user based on the user input.

17. The non-transitory computer-readable medium of claim 16, wherein determining the real-time price includes increasing the default price by a second multiplier.

18. The non-transitory computer-readable medium of claim 17, wherein the executed instructions further cause the computer system to perform operations that include:
   providing a user interface to enable the user to make the service request, the user interface including a graphic that identifies the second multiplier.

19. The non-transitory computer-readable medium of claim 16, wherein the executed instructions further cause the computer system to perform operations that include:
   determining the real-time price by determining a price per distance traveled and a price per time spent for transporting the user from the current location to the destination location.

20. The non-transitory computer-readable medium of claim 16, wherein the intermediate interface includes a prompt that requests the user to input one or more characters in a text field of the intermediate interface.

* * * * *